United States Patent [19]

Austin, Jr.

[11] 4,303,045

[45] Dec. 1, 1981

[54] APPARATUS TO CONVERT OTTO CYCLE ENGINE TO DIESEL ENGINE

[76] Inventor: George C. Austin, Jr., 1901 S. Fourth St., Alhambra, Calif. 91803

[21] Appl. No.: 215,936

[22] Filed: Dec. 12, 1980

Related U.S. Application Data

[63] Continuation of Ser. No. 26,352, Apr. 2, 1979, abandoned, which is a continuation-in-part of Ser. No. 927,030, Jul. 24, 1978, abandoned.

[51] Int. Cl.³ .............................................. F02B 19/14
[52] U.S. Cl. .................................. 123/266; 123/41.32; 123/193 EP; 123/269
[58] Field of Search ......... 123/193 P, 193 H, 193 CP, 123/193 CH, 41.3, 41.31, 41.32, 48 R, 48 A, 48 B, DIG. 7, 266, 269, 270, 275, 276, 280, 286; 239/132; 165/135

[56] References Cited

U.S. PATENT DOCUMENTS

| | | | |
|---|---|---|---|
| 1,539,133 | 5/1925 | Markle et al. | 123/41.32 |
| 2,658,493 | 11/1953 | Kloss | 123/269 |
| 2,677,356 | 5/1954 | Pielstick | 123/266 |
| 2,769,434 | 11/1956 | Witzky | 123/276 |
| 2,914,042 | 11/1959 | Riesler | 123/286 |
| 2,972,987 | 2/1961 | Steidler | 123/275 |
| 3,105,470 | 10/1963 | Hockel et al. | 123/269 |
| 3,259,116 | 7/1966 | Bricout | 123/269 |
| 3,965,872 | 6/1976 | Taira et al. | 123/269 |
| 4,046,116 | 9/1977 | Burnham | 123/48 R |

Primary Examiner—P. S. Lall
Attorney, Agent, or Firm—William W. Haefliger

[57] ABSTRACT

A system for converting a spark ignition Otto cycle engine into a compression ignition or Diesel cycle engine comprises:

(a) compression means connected to the engine piston end portion closest the combustion zone to effect an increase in heating and pressurization of intake air in that zone, (b) pre-combination chamber means independent of, and attached to, the engine head to communicate with said zone via the spark plug opening in the head, said chamber means having an inlet to pass pressurized fuel into the interior of said chamber means, for mixing with air from said combustion zone to pre-combust and flow to the combustion zone wherein combustion is completed, and (c) cooling means including a coolant passage adjacent said pre-combustion chamber to circulate fluid coolant in heat receiving relation with said chamber.

1 Claim, 7 Drawing Figures

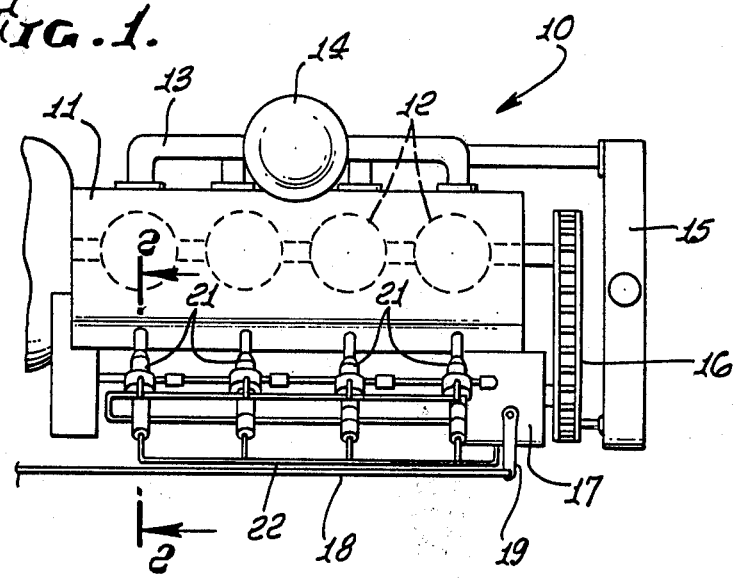
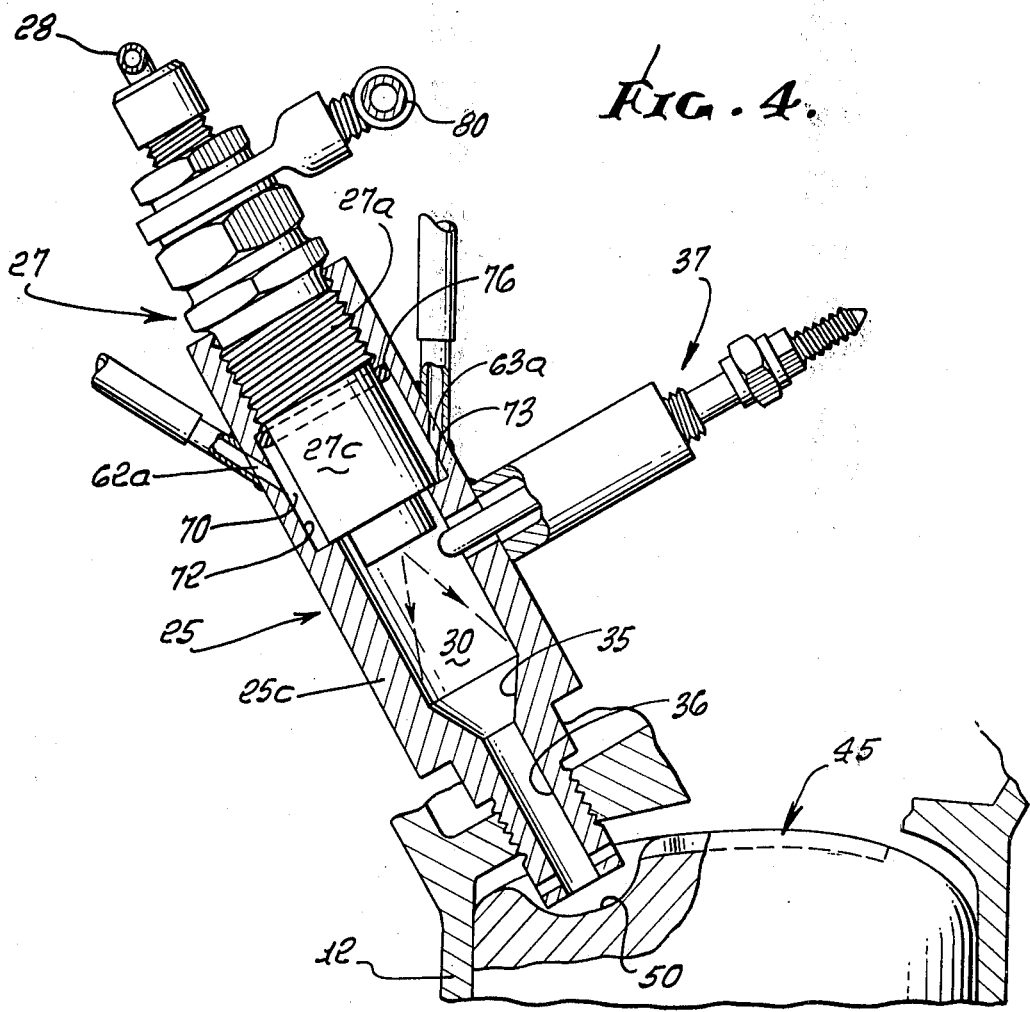

APPARATUS TO CONVERT OTTO CYCLE ENGINE TO DIESEL ENGINE

This is a continuation of application Ser. No. 26,352, filed Apr. 2, 1979 which was CIP of 927,030, filed July 24, 1978, both now abandoned.

BACKGROUND OF THE INVENTION

This invention relates generally to engine modification, and more particularly concerns conversion of conventional spark ignition Otto cycle engines to compression ignition or Diesel cycle engines.

The recent widespread interest in reductions in hydrocarbon consumption, and fuel savings, has resulted in increased attention given to Diesel engine use. Employment of such engines in vehicles results in higher miles per gallon achievement than with spark ignition engines, and in addition the retail cost of Diesel fuel is less than the cost of gasoline. However, the conversion to Diesel engine use is necessarily slow due to the existing millions of spark ignition engine powered vehicles presently in use, and which will continue to be used for a number of years. If it were possible to economically convert such existing spark ignition engines into Diesel engines, the savings in fuel usage and cost would be very substantial. However, no way was known, to my knowledge, prior to the present invention, to achieve such conversion in the simple, economical manner now afforded by the present invention, and which provides the unusual combinations of structure, function and results now made possible.

SUMMARY OF THE INVENTION

It is a major object of the invention to meet the above described need through the provision of simple apparatus and method to economically and readily convert a conventional spark ignition engine into a compression ignition, or Diesel, engine. Basically, the invention is embodied in pre-combustion chamber means attached to the engine head to project outside the engine and also to communicate with the combustion zone in the engine (i.e. in the cylinder at the spark plug end of the piston), the pre-combustion chamber having an inlet to pass fuel injected into the chamber interior for pre-combustion with piston compressed intake air rammed into the chamber from the combustion zone. As will be seen, the pre-combustion chamber means typically has barrel configuration, with a threaded end portion fitting the threaded opening in the engine head from which a spark plug has been removed; also it has a tip portion penetrating into the engine cylinder and provided with orifice means sized to control the flow of air into the barrel, and the reverse flow of high pressure precombusted products from the barrel into the cylinder where combustion is completed. A glow plug is typically attached to the barrel to assist in cold starting, and a coolant fluid jacket or finned section typically surrounds the barrel to cool the heat sensitive area nearest the nozzle by coolant circulation (air or liquid), as will be seen.

Another object concerns the provision of compression means connected to the piston end portion closest the combustion zone to effect an increase in heating and pressurization of intake air to compression ignition levels when that air is rammed into the precombustion chamber. Such compression means typically includes a cap containing a first recess to closely receive the pre-combustion barrel tip portion, and second and third recesses to receive the engine valves as they open away from their seats. The first recess is shaped to act as a guide and aid for air flow into the barrel via the orifices, and for pre-combusted products flow back into the cylinder. Also, a venturi throat sunk in the cap communicates the first recess with the second and third recesses, to funnel (with acceleration) air flow to the first recess from the second and third recesses, and gas flow (pre-combusted products) from the first recess to the second and third recesses to swirl and mix therein, promoting smooth final combustion in the cylinder.

Accordingly, the invention provides the following advantages:

(1) A suitable means of raising the compression ratio to a point where the combination of heat and pressure will cause auto-ignition of the fuel when a timed high pressure spray impinges upon the high temperature air mass (either thru installation of new pistons or the additions of caps to reduced cylinder head volume).

(2) A means of installing a pre-combustion chamber into an existing or modified aperture in a cylinder head with a suitable method of cooling the injection nozzle and adjoining areas while at the same time retaining maximum temperature in the rest of the pre-chamber for improved efficiency; the pre-chambers in addition to the temperature control characteristic, are of suitable size and shape to at all times enhance and contain combustion, without leakage, and to normally have provision for "cold start" capability through the use of internal resistance heating elements called "glow plugs" inserted through the outer walls of the pre-chambers.

(3.) Cooling is accomplished through liquid heat transfer or direct art transfer, or a combination of both.

(4.) A timed injection pump is employed, the pump timing at all times to be "sensed" with respect to engine crankshaft rotation. Fuel volumes and pressures are delivered subject to requirements.

These and other objects and advantages of the invention, as well as the details of an illustrative embodiment, will be more fully understood from the following description and drawings, in which:

DRAWING DESCRIPTION

FIG. 1 is a plan view of an engine, originally of spark ignition type, after conversion to a Diesel engine, in accordance with the invention;

FIG. 4 is a view like FIG. 2, but showing a modification;

DETAILED DESCRIPTION

Figure 3:
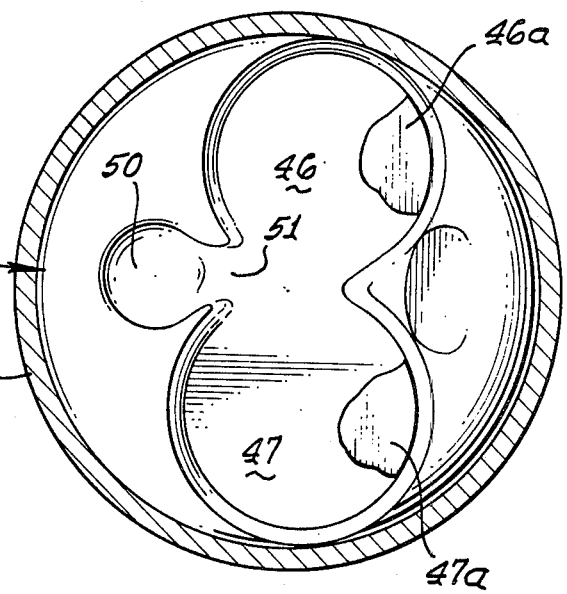
FIG. 3 is a horizontal view taken in section on lines 3—3 of FIG. 2.

Referring first to FIG. 1, the numeral 10 generally designates an engine which was constructed originally as a spark ignition or Otto cycle engine, and which has been converted to a Diesel engine in accordance with the invention. It includes cylinder block, 11 containing cylinders 12, air intake manifold 13, air cleaner 14 connected to that manifold, and radiator 15 to cool liquid coolant for the engine. Crankshaft driven timing belt 16 drives a fuel pump 17 attached to the engine and operable to supply Diesel fuel under pressure to pre-combustion chamber means to be described. A throttle link 18 is connected to a lever 19 operatively connected to valve 20 (see FIG. 2) associated with the pump and via which fuel is delivered to the pre-combustion chambers indicated at 21 in FIGS. 1 and 2. Line 22 delivers such fuel to the chambers.

Figure 2:
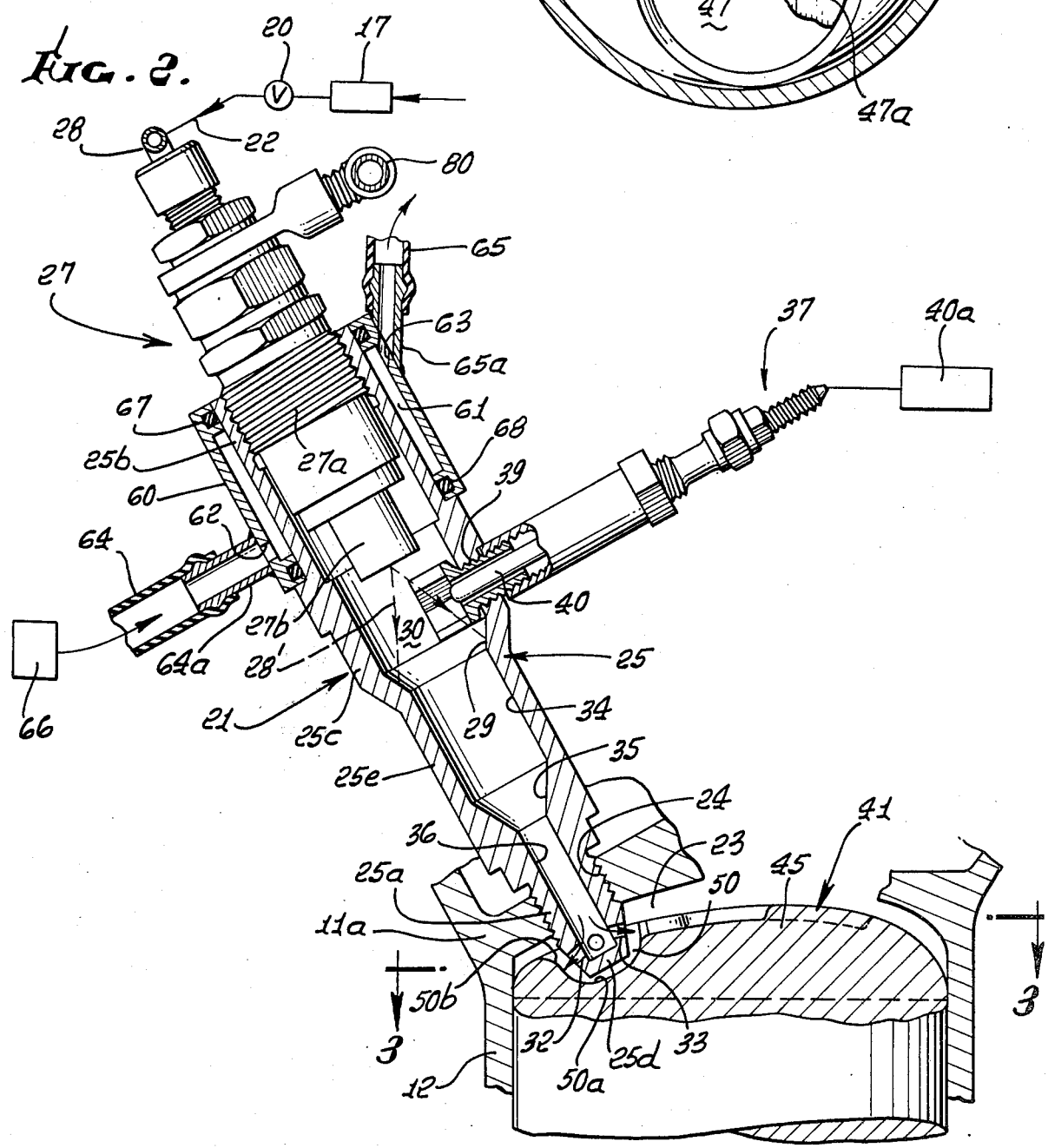
FIG. 2 is an enlarged vertical section on lines 2—2 of FIG. 1.

In FIG. 2, the pre-combustion chamber means is independent of, but attached to, the engine head 11a to communicate with the combustion zone 23 within the engine, via the threaded opening or socket 24 from which a spark plug has been removed. Each of the cylinders has such a pre-combustion means associated with it. More specifically, the pre-combustion means comprises a tubular barrel 25 having a reduced diameter, threaded end portion 25a with screw threaded telescopic attachment to the engine head.

The pre-combustion means also includes a tubular injector 27 which may comprise a known Robert Bosch injector. It has an externally threaded section 27a with threaded attachment to the internally threaded barrel section 25b. The injector has an inlet at 28, which communicates via the tubular bore of the injector with the injector end orifice section 27b. Pressurized fuel is injected in a conical spray pattern at 28' into the barrel largest internal diameter section 25c, and generally toward the frusto-conical bore wall 29. Section 25c forms a mixing zone 30 wherein the fuel mixes with compressed air entering the barrel from the combustion zone 23.

In this regard, the barrel has a tip portion 25d projecting into the combustion zone 23, and provided with orifice means (such as twin lateral orifices 32 and 33 sized to control the flow of compressed air entering the barrel 25 from zone 23, and to control the flow of pre-combusted products from the barrel to zone 23, via the orifices. The barrel section 25e has a reduced bore 34, which is substantially less than the bore of mixing zone 30, to accelerate the flow of pre-combusted products toward the orifices via frusto-conical bore 35 and further reduced bore 36. The latter directly communicates with the orifices. A glow plug 37 projects sidewardly into the barrel between the tip portion 25d and inlet 28; more specifically the glow plug 37 is attached to the barrel section 25c, as via threading at 39, so that the hot wire or element 40 of the glow plug is in direct communication with the mixing zone 30. A source of electrical current to heat element 40 is indicated at 40a, cold starting there being aided.

Hot compressed air blasting into that zone 30 encounters the hot lower end portion 27b of the injector which turns the air flow reversely causing it to swirl in zone 30 and mix with fuel injected therein. The mixture is ignited to pre-combust in chamber 30 and as it flows with expansion, greatly increased pressurization and acceleration back out of the barrel into zone 23, combustion is completed to drive the piston 41 downwardly in the cylinder.

Compression means is also provided, and is connected or attached to the piston end portion closest to the combustion zone 23, to effect an increase in heating and pressurization of the air in that zone. Such compression means comprises a cap 45 extending over and connected to the piston end portion. For that purpose, the cap may be integral with the piston end portion, or suitably attached to it as via fasteners or bonding. Referring to FIGS. 2 and 3, the cap 45 contains shallow circular recesses or wells 46 and 47 to receive the engine valves or valve heads (portions of which appear at 46a and 47a in FIG. 3) as they are displaced downwardly to open the valve ports to admit air to the cylinder and to pass combustion products from the cylinder. The cap also contains a primary recess 50 sunk therein to closely receive the tip portion 25d as the piston arrives at top dead center. Finally, the dome-shaped cap defines a venturi throat 51 communicating between primary recess 50 and second and third recesses 46 and 47 to guide and accelerate the flow of the precombusted products into the second and third recesses for efficient swirling and mixing therein to promote smooth final combustion in the engine cylinder. Also, the throat guides air flow from the recesses 46 and 47 into recess 50 for entering into the barrel 21 via orifices 33 and 32. Note that orifice 33 directly laterally faces the throat 51, whereas orifice 32 faces toward the side of the recess 50 furthest from the throat, there being clearance about the tip 25d and between the latter and the wall of the recess 50. Recess 50 is dome-shaped to promote flow to and from the orifices, and has a concave interior 50a, and an annular convexly rounded shoulder 50b to aid gas flow into the orifices and gas flow back into the cylinder.

FIG. 2 also illustrates the provision of a tubular jacket 60 about the barrel upper portion 25b receiving the injector 27, the jacket spaced from the portion 25b to provide an annular fluid coolant passage 61 therebetween. The jacket defines fluid coolant inlet and outlet ports 62 and 63 for circulating coolant (such as water) through passage 61 to cool the barrel, heat flowing from barrel portions 25b, 25c, and 25d, to the coolant. Note coolant ducts 64 and 65 removably attached to stubducts 64a and 65a braze connected to the barrel. Water is delivered from a pump 66 to duct 64, and is circulated to the radiator 15 for cooling. Suitable annular seals 67 and 68 seal off between cylinder jacket 60 and the barrel, as shown, at the opposite ends of passage 61.

In the modification shown in FIG. 4, the structure is the same as in FIG. 2, except that the water jacket is integral with the barrel. Thus, the barrel contains an annular recess 70 extending about the injector 27 body portion 27c. That recess is formed by a counterbore 72 in the barrel. A step shoulder 73 at the end of the recess serves as a seat for the injector, as shown. Ports 62a and 63a corresponds to ports 62 and 63 in FIG. 2, and are formed in the barrel 25. Section 25e of the barrel in FIG. 2 is eliminated, and mixing zone 30 directly communicates with narrowed bore 36, via tapered bore 35. An annular seal 76 is provided between 27c and bore 72 adjacent thread 27a.

Finally, weep line 80 normally associated with injector 27 in FIGS. 2 and 3 is suitably plugged.

It is clear from what has been said that the chamber 21 may easily be attached to any Otto cycle engine from which a spark plug has been removed. Also, the cap 45 for the piston end may be easily attached thereto. Significant savings in fuel consumption are realize with the invention; for example, about 50 miles per gallon were achieved with a standard Vega automobile, over a test course that included both city street and expressway driving conditions. The fuel used was Diesel fuel.

Figure 5:
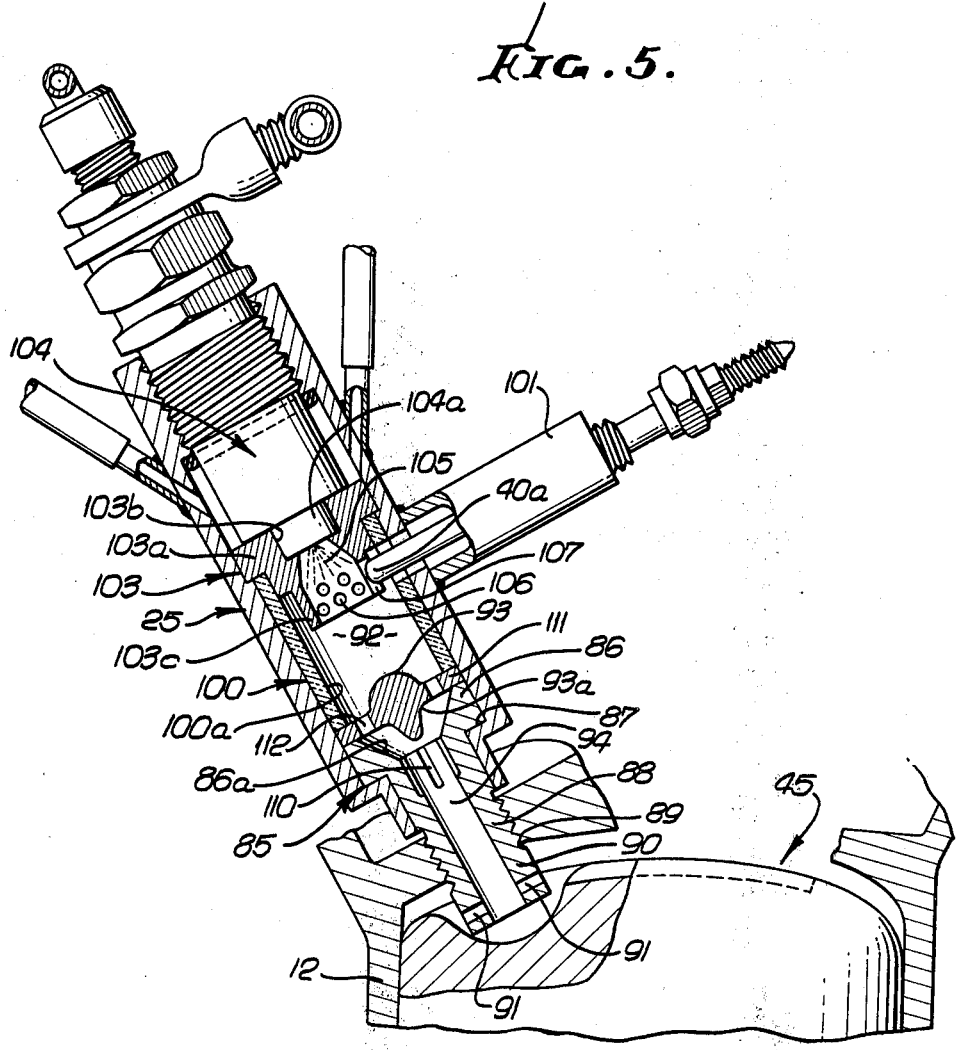
FIG. 5 is a view like FIG. 2, but showing another modification.

In the modification shown in FIG. 5, the structure is similar to that of FIG. 2; however additional elements are provided. Thus, an attachment fitting 85 is received in the barrel 25 and includes an annular head 86 engaging the barrel step shoulder 87. The fitting includes a tubular first portion 88 that projects from the barrel and has screw threaded attachment to the head, at 89; the fitting 85 also includes a tubular second portion 90 penetrating through the spark plug opening, and provided with lateral orifices 91 sized to control the flow of air to the pre-combustion chamber interior 92, and to control the flow of pre-combusted products from the chamber interior to the engine cylinder interior. The fitting thereby attaches the barrel to the engine block or head, and also controls flow of air and pre-combusted products. The fitting is shown as broached at 110 to receive a tool to rotate the fitting and make-up the threads at 89.

Figure 5A:
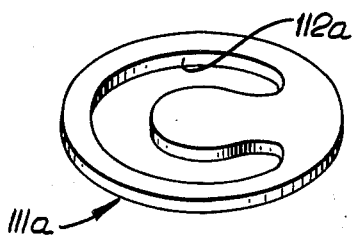
FIGS. 5a and 5b show alternate fitting caps.
Figure 5B:
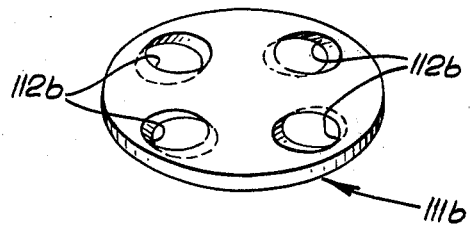

A cap 111 on the fitting has a flow of diffusing surface, as for example provided by dome 93, that projects into the chamber interior 92 to diffuse the flow of entering air throughout the chamber, and to guide the flow of pre-combusted products from the chamber into the bore 94 defined by the fitting. Note flow guide passages provided by the concave under surface 93a of the cap, and the frusto-conical top surface 86a of the head 86. Angled ports 112 through the cap act to swirl the flow entering the interior 92. The dome also tends to become heated to a level that assists pre-combustion in the chamber 92. Fitting 85 is typically metallic. FIGS. 5a and 5b show alternate caps or washers 111a and 111b, with ports 112a and 112b.

FIG. 5 also illustrates the provision of a thermal barrier sleeve 100 fitted within the barrel to provide a thermal barrier between the sleeve and the barrel due to the interface or interfaces between them. The sleeve extends endwise of (and fits against) the fitting head 86, and contains a side opening to pass the end portion 40a of the glow plug projecting into the pre-combustion space 92. The glow plug projects within its own barrel 101. The sleeve bore 100a may be sized to control the volume of the space 92.

Finally, a cover for space 92 is provided at 103, and is provided with a head 103a that retains the sleeve in position. The head may contain a bore 103b to receive the reduced end 104a of the fuel pressurizing nozzle 104 received in the barrel 85, whereby the nozzle orifice ejects pressurized fuel in a diverging pattern 105 within a tubular projection 103c from the head 103a. That projection defines side ports 106 in chamber space 92 to allow lateral escape of the injected fuel spray. The glow plug tip 40a projects into proximity to the tubular portion 103c, as via a side opening 107, to heat the portion 103c, aiding fuel pre-combustion.

Elements 85, 93 and 103c also cooperate to enhance and control turbulence of the entering air and pre-combusted products in space 92, for aiding such pre-combustion.

I claim:

1. In a system for converting a spark ignition Otto cycle engine into a compression ignition or Diesel cycle engine, the engine including a combustion zone adjacent the end of the piston and wherein intake air is heated and compressed, the combination comprising
    (a) pre-combustion chamber means independent of and attached to the engine head to communicate with said zone via the spark plug opening in the head, said chamber means having an inlet to pass pressurized fuel into the interior of said chamber means, for mixing with air from said combustion zone to pre-combust and flow to the combustion zone wherein combustion is completed, and
    (b) said pre-combustion chamber means comprising a tubular barrel having a threaded portion with screw threaded telescopic attachment to the head, said barrel having a tip portion penetrating through said spark plug opening and provided with orifice means sized to control the flow of air to said chamber and to control the flow of pre-combusted products from said chamber, and
    (c) means forming a thermal barrier between the barrel and the chamber interior,
    (d) injection means fitting the barrel to provide a cover and a tubular projection aligned with the chamber interior to pass pressurized fuel into that interior, and
    (e) flow diffusing surfaces in the chamber to diffuse air throughout the chamber and guide the flow of pre-combusted products from the chamber toward said tip portion,
    (f) said tip portion being at one end of the barrel, and said inlet being at the opposite end of the barrel, there being a glow plug projecting sidewardly into the barrel between said tip portion and said inlet,
    (g) compression means connected with the piston end portion closest to the combustion zone to effect an increase in heating and pressurization of intake air in that zone, said compression means comprising a cap extending over and connected to said piston end, the cap containing recesses to receive the engine valves and a gas flow guide recess in alignment with said spark plug opening to guide air flow from said zone to said chamber and to guide the pre-combusted products from said chamber to said zone, and
    (h) cooling means including a coolant passage adjacent said pre-combustion chamber to circulate fluid coolant in heat receiving relation with said injection means, said cooling means including a tubular jacket about the injection means in the form of a barrel, but everywhere spaced from that portion of the barrel attached to the engine head.

* * * * *